March 8, 1966 Y. P. VERMA ET AL 3,239,764
SHIFT REGISTER EMPLOYING LOGIC BLOCKS ARRANGED IN CLOSED LOOP AND MEANS FOR SELECTIVELY SHIFTING BIT POSITIONS
Filed Aug. 29, 1963 2 Sheets-Sheet 1

INVENTORS
YASH P. VERMA
MERLIN G. SMITH
BY Edward G. Fiorito
ATTORNEY

United States Patent Office 3,239,764

Patented Mar. 8, 1966

3,239,764

SHIFT REGISTER EMPLOYING LOGIC BLOCKS ARRANGED IN CLOSED LOOP AND MEANS FOR SELECTIVELY SHIFTING BIT POSITIONS

Yash P. Verma, Peekskill, and Merlin G. Smith, Yorktown Heights, N.Y., assignors to International Business Machines Corporation, New York, N.Y., a corporation of New York Filed Aug. 29, 1963, Ser. No. 305,256
4 Claims. (Cl. 328—37)

This invention relates to apparatus employed in digital computers, and more particularly to a shift register.

It has been found that high-speed operation can be attained by cascaded logic blocks energized in a cyclic sequential manner. In such systems a power supply is employed which regulates the flow of data pulses through the cascaded logic blocks.

Storage of data bits is achieved in such systems by forming a closed loop of cascaded logic blocks. The blocks are energized in a sequential manner so that the data bits are circulated about the loop. The present invention is broadly directed to a novel manner of interconnecting a plurality of closed loops to form a shift register. This shift register has the advantage of high speed and flexibility in selecting the number of bit positions to be shifted.

Another feature of the present invention is the novel manner in which the logic blocks are interconnected to form the closed loop. Such loops permit read-out or read-in at any point along the loop providing a high degree of flexibility when used to form a shift register.

It is an object of the present invention to provide an improved shift register.

It is a further object of the present invention to provide an improved shift register employing logic blocks energized in a cyclic sequential manner.

It is another object of the present invention to provide an improved shift register employing a plurality of logic blocks arranged in a closed loop forming individual bit positions in the shift register.

An additional object of the present invention is to provide a shift register having a high degree of flexibility in selecting the number of bit positions to be shifted.

The foregoing and other objects, features and advantages of the invention will be apparent from the following more particular description of a preferred embodiment of the invention, as illustrated in the accompanying drawings.

Figure 1:
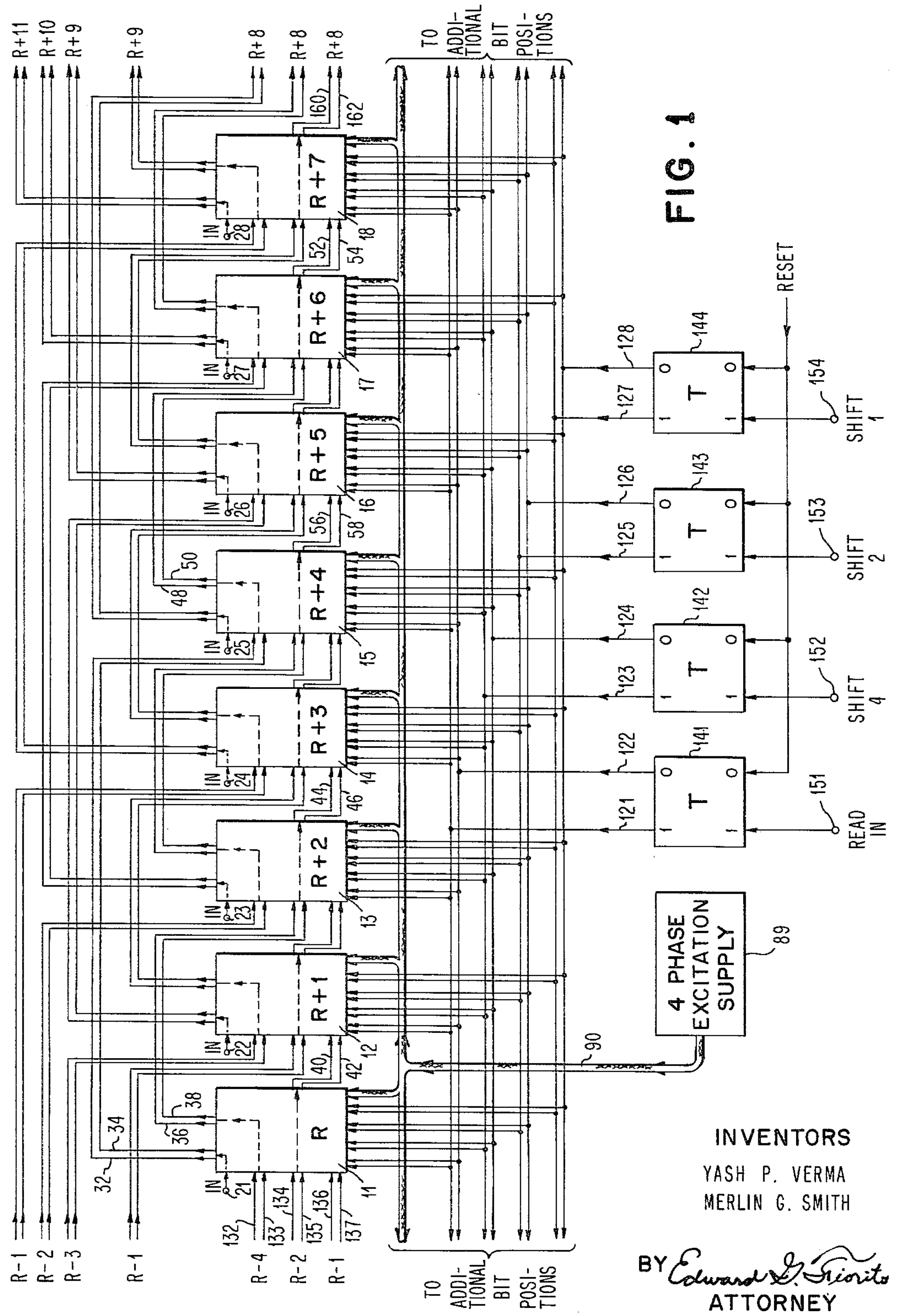
FIG. 1 is a block diagram illustrating a shift register constructed in accordance with the present invention.

The general operation of the shift register can be illustrated by referring to FIG. 1. A plurality of bit positions 11–18 are designated R, $R+1$, . . . $R+7$ respectively. Each of the bit positions stores a single data bit which may be shifted toward the right. The data bits are inserted into the bit positions 11–18 via input terminals 21–28 respectively.

As an example of the operation of the shift register shown in FIG. 1, the path followed by a data bit shifted from position 11 (R) to various other positions is described. Assuming that a data bit is applied to input terminal 21 and stored in position 11 (R), there are three different output paths which the data bit may follow. First the data bit may be shifted via a pair of lines 32 and 34 to position 15 ($R+4$) located four bit positions away from the bit position 11 (R). Consequently, this data bit is simultaneously erased from position 11 (R). Second, the data bit in position 11 (R) may be shifted to position 13 ($R+2$) via a pair of lines 36 and 38. Third, the data bit in position 11 (R) may be shifted to position 12 ($R+1$) via a pair of lines 40 and 42. Therefore the bit in position 11 (R) may be shifted one, two, or four positions away. It may be noted at this time that each of the latter numbers is given by a term of the progression $2^0$, $2^1$, $2^2$. As discussed later, additional shifts may be made to positions located a number of bit positions away given by a higher term in the progression.

In order for a data bit in position 11 (R) to be shifted three positions away to position 14 ($R+3$), it must first be sent to position 13 ($R+2$) via lines 36 and 38. The data bit may then be transferred from position 13 ($R+2$) to position 14 ($R+3$) via a pair of lines 44 and 46 thereby completing the shift from position 11 (R) to position 14 ($R+3$).

The data bit in position 11 (R) may also be shifted to positions 17 ($R+6$) and 18 ($R+7$) by first shifting the bit to position 15 ($R+4$) via lines 32 and 34. The data bit is then shifted from position 15 ($R+4$) to position 17 ($R+6$) via a pair of lines 48 and 50. In order to complete a shift from position 11 (R) to position 18 ($R+7$) the data bit may be shifted from position 17 ($R+6$) to position 18 ($R+7$) via a pair of lines 52 and 54.

Phantom lines and arrows have been placed inside each of the positions 11–18 to show the most direct coupling between the input to the stations and the output from the stations. However as will become more apparent from the detailed description of the circuitry within each of the stations 11–18, shown in FIG. 2, a data bit may be shifted through any one of the outputs regardless of the input upon which the data bit arrived. As an illustration of a case where such flexibility is necessary, the shift from position 11 (R) to position 16 ($R+5$) is described. The data bit in position 11 (R) is shifted via lines 32 and 34 to position 15 ($R+4$). Instead of shifting the data bit out of lines 48 and 50 which are connected to lines 32 and 34 by a phantom line, the data bit is shifted at a later time out of a pair of lines 56 and 58 to complete a shift of five positions from initial position 11 (R).

It has been shown above that a bit may be shifted from position 11 (R) to any of the remaining positions 12–18 ($R+1$ . . . $R+7$). In a similar manner it may be shown that data bits can be shifted from position 12 ($R+1$) to any of the positions 13–18 ($R+2$ . . . $R+7$) since the interconnections between related positions are the same. Shifts from blocks 13–18 ($R+2$ . . . $R+7$) are performed in the same manner.

A description of the remaining circuitry and blocks in FIG. 1 is reversed until after the details of the stations 11–18 are described.

Figure 2:
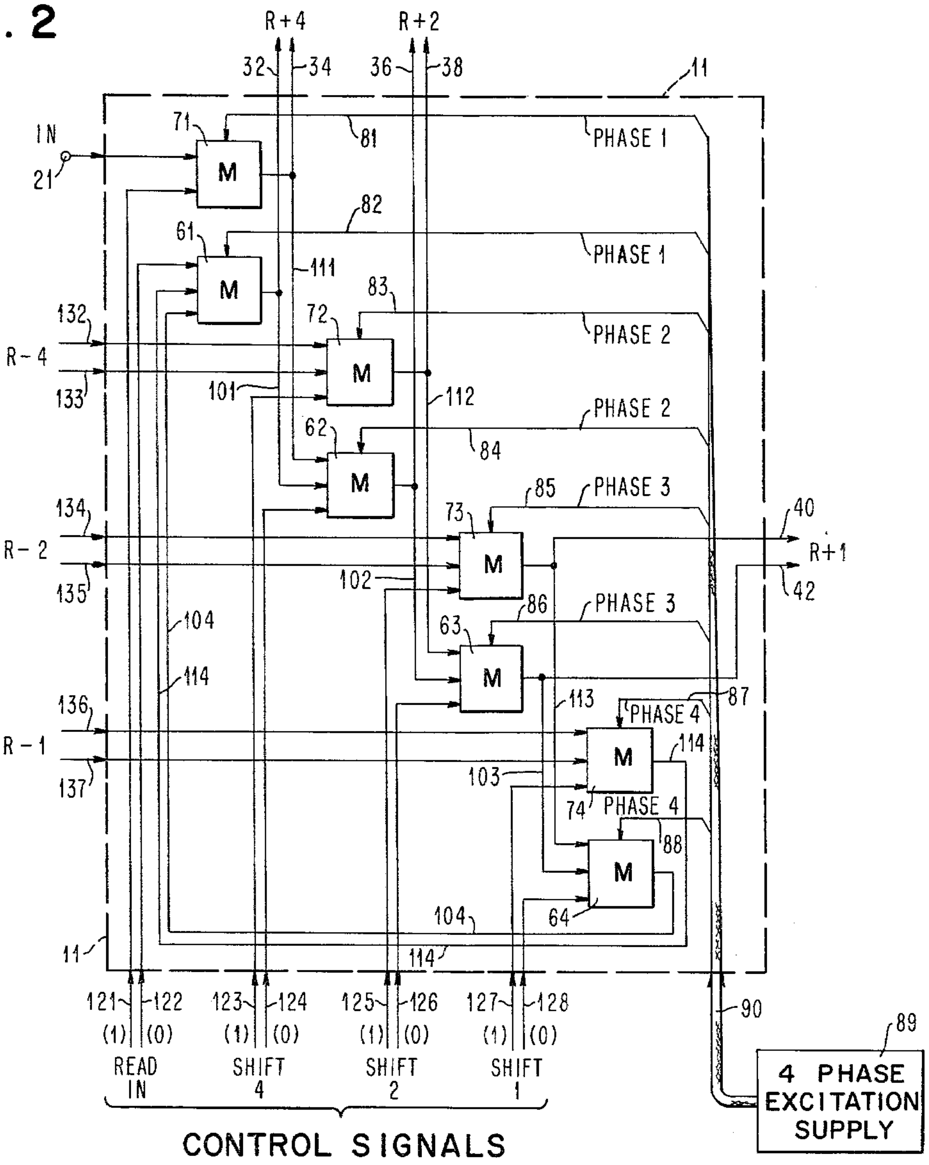
FIG. 2 is a block diagram showing the details of one of the bit storage positions shown in FIG. 1.

*Detailed description of bit position, FIG. 2*

Each of the bit positions 11–18 of the shift register shown in FIG. 1 must be capable of accepting a data bit on one of four inputs, and either storing that data bit or providing it upon one of three different outputs. The details for accomplishing this function are shown in FIG. 2.

Figure 3:
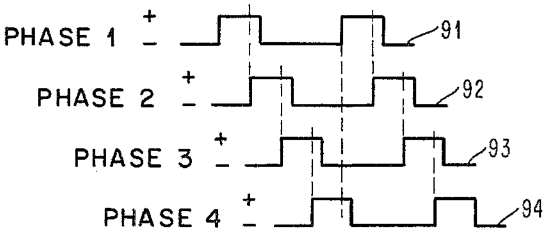
FIG. 3 is a waveform diagram illustrating the energization signals provided by a supply in FIGS. 1 and 2.

FIG. 2 illustrates the details of bit position 11 (R); however the same details are included in the other bit positions 12–18 ($R+1$ . . . $R+7$). The same numerical designations are assigned to the inputs and outputs of the circuit in FIG. 2 as are employed at bit position 11 (R) in FIG. 1. Eight majority logic blocks 61–64 and 71–74 are employed in the bit storage position shown in FIG. 2. A two or three input majority logic block performs the function of providing a positive output signal when ever positive signals are applied to two or more inputs. The output occurs only when the majority logic block is energized. In the circuit of FIG. 2 the majority logic blocks are gated by signals on line 81–88. The gating signals on lines 81–88 are supplied via a cable 90 from a four phase excitation supply 89. The four phase supply 89 provides cyclic sequental signals as shown in FIG. 3. The waveform 91 illustrates the shape and relative phase of the cyclic signal appearing on lines 81 and 82. During the positive portion of the waveform 91 the majority logic blocks 61 and 71 are gated.

A waveform 92 in FIG. 3 illustrates the shape and phase of the signal on lines 83 and 84. It is noted that the positive portion of the waveform 92 overlaps the positive portion of the waveform 91. Therefore majority logic blocks 61 and 71 are gated during an interval when blocks 62 and 72 are gated. Therefore signals provided by blocks 61 and 71 may be passed on to blocks 62 and 72 during this interval as described below.

A waveform 93 illustrates the signal appearing on lines 85 and 86, while a waveform 94 illustrates the signal appearing on lines 87 and 88. The positive portions of waveform 93 overlap that of 92 but not the positive portions of waveform 91. Therefore majority blocks 63 and 73 are gated during an interval when majority logic blocks 62 and 72 are gated, but not during any portion of the time when blocks 61 and 71 are gated. Therefore signals cannot flow directly from blocks 61 and 71 to blocks 63 and 73 without first pausing at blocks 62 and 72.

It may be seen from the diagram in FIG. 3 that the positive portions of waveform 94 overlap the positive portions of waveform 91 so that majority blocks 64 and 74 are gated during an interval when blocks 61 and 71 are gated.

The details of the majority logic blocks 61–64 and 71–74 and the excitation supply 89 are well known in the prior art and are not shown herein. In some schemes two out-of-phase lines are supplied to each majority block in order to gate the block. An example of the latter system is described in the article "Esaki Diode High-Speed Logic Circuits," by E. Goto et al., IRE Transactions on Electronic Computers, March 1960.

Majority logic blocks 61–64 are connected in a series loop by lines 101–104. Once a signal is inserted in this loop and provided at least one other input is supplied to each of the majority logic blocks 61–64 in a manner to be described, the signal will circulate about the loop under control of the excitation signals on lines 82, 84, 86, and 88. For example the output of block 61 is passed to the block 62 via line 101 during the interval when phase 1 and phase 2 are positive. The output of block 62 is passed to block 63 via line 102 during the interval when phase 2 and phase 3 are positive. Since phase 1 and phase 3 are not positive at the same time, the output from block 61 does not pass immediately through block 62 to block 63 but must pause at block 62 until the positive portion of phase 3 arrives. The signal in block 63 passes to block 64 during the interval when phases 3 and 4 are positive, and finally the output of block 64 is fed back to the input of block 61 via line 104 during the interval when phase 4 and phase 1 are positive. Therefore the signal continues to circulate about the loop including blocks 61–64 providing a storage for one data bit.

Majority logic bloks 71–74 provide a means for inserting data bits into the look including blocks 61–64. For example the output of block 71 is applied to block 62 via a line 111. The outputs of blocks 72–74 are supplied via lines 112–114 respectively to blocks 63, 64 and 61, respectively.

The operation of bit position 11 (R) shown in FIG. 2 is controlled by signals on lines 121–128. The lines 121–128 include four pairs of complementary signals, one member of the pair being the true form and the other member of the pair being a complement form. For example whenever the signal on line 121 is positive the signal on line 122 is negative. The read-in operation is accomplished by causing the signal on line 121 to be positive and the signal on line 122 to be negative. In this condition a positive input on terminal 21 causes majority logic block 71 to receive two positive inputs. Therefore when phase 1 becomes positive block 71 provides a positive output on line 111. At the same time the signal on line 122 is negative so that even though a positive signal is fed back on either line 104 or line 114 no positive signal is provided by the output of block 61. As will be apparent from the detailed description of FIG. 1 below, both lines 104 and 114 cannot be positive at the same time so that whenever line 122 is negative the positive signal stored in the loop including blocks 61–64 is erased. Therefore whenever the read-in control lines 121 and 122 are caused to be plus and minus respectively, any positive signal on input terminal 21 is inserted through block 71 into the loop including blocks 61–64 and any positive signal which had been circulating therein is erased. When lines 121 and 122 are minus and plus respectively, block 71 is inhibited since only a single input, terminal 21, could be positive. Block 61 is permitted to pass a positive signal coming from either line 104 or 114.

Whenever a shift of four bit positions is desired, line 123 is made positive and line 124 is made negative. In this position a positive signal on either one of the lines 132 or 133 causes block 72 to provide an output on line 112. As will be described later in the detailed description of FIG. 1 the lines 132 and 133 originate at a bit storage position four positions away from the position 11 (R). At the same time block 62 is prevented from providing an output on line 102 by the negative signal on line 124 since both lines 101 and 111 cannot be positive at the same time. As described above either block 61 or 71 is enabled by the complementary signals on lines 121 and 122 so that only a single positive signal is provided by the blocks 61 or 71 which is insufficient to cause block 62 to provide an output.

In a similar manner control signals on lines 125 and 126 cause any positive signals on the lines 134 and 135 to be inserted into the loop at logic block 64, and control signals on lines 127 and 128 cause any positive signals on lines 136 and 137 to be inserted into the loop at logic block 61.

Whenever the bit position is to store the signal, lines 122, 124, 126, and 128 are made positive while the remaining control lines 121, 123, 125, and 127 are negative. This causes the majority blocks 61–64 to be enabled and permits any positive signal to be circulated about the loop formed by blocks 61–64.

The outputs 32, 34, 36, 38, 40, and 42 from the bit storage position 11 (R) are taken from the output terminals of majority logic blocks 61, 71, 62, 72, 63, and 73 respectively.

*Detailed description of the shift register, FIG. 1*

The control signals 121–128 are supplied by a group of four triggers 141–144. The outputs of the triggers 141–144 are complementary. That is whenever the output on line 121 is positive the output on line 122 is negative. Control of triggers 141–144 is accomplished by signals applied to the input terminals 151–154 respectively. For example when a positive signal is applied to the read-in terminal 151 the trigger 141 is set into the one state thereby providing a positive signal on line 121 and a negative signal on line 122. A reset line 156 is provided for placing the trigger 141 (and all other triggers) in the zero state thereby providing a positive signal on line 122 and a negative signal on line 121.

The output of each of the triggers 141–144 is supplied in parallel to all of the bit positions 11–18 as shown in FIG. 1. When all of the triggers 141–144 are in the reset state any positive signals stored within the positions 11–18 continue to circulate in the associated loop as described in the detailed description of FIG. 2. Read-in is accomplished by applying a positive signal to terminal 151. In this condition any positive signals on input terminals 21–28 are inserted into the associated bit positions. A shift register of the type shown in FIG. 1 and having eight bit storage positions can accommodate an eight bit word which may be read-in in parallel. When it is desired that the eight bit word be shifted one position, a signal is applied to shift one terminal 154. As shown in FIG. 2 a positive signal is applied to block 74 of position 11 (R) and to the corresponding block 74 in position 12 ($R+1$). Therefore any positive signal appearing on either line 40 or line 42 causes the block 74 in position 12 ($R+1$) to provide an output during the interval when phase three and phase four are positive. In this manner the data bit circulating in position 11 (R) is transferred to position 12 ($R+1$). In a like manner the data bits in positions 12–17 ($R+1 \ldots R+6$) are shifted to positions 13–18 ($R+2 \ldots R+7$) respectively since all of the positions 12–18 ($R+1 \ldots R+7$) receive the same control signals. The data bit in position 18 ($R+7$) is shifted to a position $R+8$ (not shown) via a pair of lines 160 and 162. Similarly the data bit in a position $R-1$ (not shown) is inserted in position 11 (R) via lines 136 and 137. Additional bit positions may be added to the shift register shown in FIG. 1. The interconnections between the additional bit positions (not shown) are indicated by the designations $R-1$, $R-2$, $R-3$ and $R-4$ on the left side and $R+8$, $R+9$, $R+10$, and $R+11$ on the right side of the shift register. The additional bit positions are controlled by lines 121–128 and are energized by signals on cable 90.

More than one of the triggers 142–144 can be energized at one time. If a shift of seven is desired input terminals 152–154 are activated so that triggers 142–144 are set in the one state. Therefore a positive signal supplied by either block 61 or 71 in position 11 (R) causes a positive signal to be supplied to the logic block 72 in position 15 ($R+4$). The output of the block 72 in position 15 ($R+4$) provides an output on line 50. The output on line 50 enables the block 73 in position 17 ($R+6$) thereby providing a signal on line 52. Finally a signal on line 52 enables the block 74 in position 18 ($R+7$) thereby providing a feed-back signal to the block 61 in position 18 ($R+7$). The reset signal on line 156 may be timed to occur after the shifted signal has arrived at position 18 ($R+7$) since the signal is to be stored in the loop within position 18 ($R+7$).

As described in the preceding paragraph the data bit advanced to a new bit position each time the excitation supply advanced one phase. However when a shift of five is desired a data bit is stored within one of the bit positions while the excitation supply 89 advances one phase. This may be shown by observing the shift of a data bit from position 11 (R) to position 16 ($R+5$). To accomplish this triggers 142 and 144 are set in the "one" state. When phase one is positive, a signal provided by blocks 61 or 71 is sent via lines 32 and 34 to the block in position 15 ($R+4$) corresponding to block 72. The positive signal is advanced from the corresponding block 72 to corresponding block 63 in position 15 ($R+4$) when phase two and phase three are both positive. Finally, a signal is provided on line 58, FIG. 1, to block 74 of position 16 ($R+5$) when phase three and phase four are both positive. Therefore during the advance of the excitation supply 92 from phase two to phase three no transfer between bit positions occurred.

Returning to FIG. 2 it may be seen from the above description that both of lines 104 and 114 cannot be positive at the same time since majority blocks 64 and 74 cannot be enabled at the same time. For example when all of the triggers 141–144 are in the reset condition only the blocks corresponding to blocks 61–64 in each position are enabled, and no input signals are provided from the blocks corresponding to blocks 71–74. Therefore although majority block 74 could receive a signal on line 137 from the majority block in position $R-1$ corresponding to block 63, there could be no signal on line 136 which is provided by the majority block in position $R-1$ corresponding to block 73. Therefore when all of the triggers are in the zero state and line 127 is negative, the largest number of inputs that could be supplied to block 74 is one. In such case no signal would appear on line 114. On the other hand if trigger 144 is in the "one" state, block 64 is supplied with a negative signal on line 128. Since both lines 103 and 113 cannot be positive at the same time due to the complementary control signals on lines 125 and 126 and also the complementary control lines effecting the appearance of signals on lines 134 and 135 from position $R-2$, majority block 64 provides no output on line 104.

Although the embodiment described above employs a four-phase excitation supply 89, the number of phases can be expanded or contracted. For example in a five-phase system five pairs of majority logic blocks would be employed in each bit position. In such a system an additional fourth output would be provided by each bit position. This fourth output would be connected to a bit storage position located $2^3$ or eight positions away. It can be seen that each time another pair of majority logic blocks is added and the number of phases in the excitation supply is expanded, a new output is provided at each bit position. This new output is connected to a bit position located a number of bit positions away. Such number is given by the last term in the progression $2^0, 2^1, 2^2, \ldots 2^{N-2}$ where N is the expanded number of phases in the system.

In summary, a shift register has been shown which employs logic blocks connected in a series loop. Each of the blocks is excited by a cyclic signal in a sequential manner so that data bits may be circulated and stored in a loop. Logic blocks in various bit positions are interconnected so that data bits may be shifted from one bit position to another. The interconnected blocks are selected so that they are energized by phase excitation signals which are adjacent in the sequence. Therefore bits may be transferred from the circulating loop in one bit position to a circulating loop in another bit position where they continue to be stored in the latter loop.

While the invention has been particularly shown and described with reference to a preferred embodiment thereof, it will be understood by those skilled in the art that various changes in form and details may be made therein without departing from the spirit and scope of the invention.

What is claimed is:

1. A shift register comprising:

a plurality of bit storage positions arranged in a row for storing data bits, each of said bit positions including, a plurality of logic blocks connected in a series loop to circulate data bits therein, and means for supplying cyclic excitation signals to each block in a sequence to control the circulation of said data bits in said loop;

coupling means for transferring data bits between a first bit position in said row and a plurality of second bit positions in said row, said coupling means including circuit connections between each of a number of logic blocks in said first position and a logic block in said second positions, the latter block in said second positions receiving the next excitation signal in said sequence after the excitation signal supplied to the logic block in said first position connected thereto; and means for controlling said coupling means to transfer the data bit in said first position selectively to any of said second bit positions.

2. A shift register comprising:

a plurality of bit storage positions arranged in a row for storing data bits, each of said bit positions including, N pairs of majority logic blocks where N is any integer, having a first and a second block in each pair, the first blocks of said pairs being interconnected to form a series loop, the second block of each pair having the output thereof connected to the input of the first block in the following adjacent pair in said series loop;

an excitation supply having N phases including means for supplying cyclic excitation signals in a sequence to the pairs of blocks in each position so that said data bits are circulated within each loop in a synchronized fashion with corresponding blocks in each loop having simultaneous excitation;

N pairs of control lines, one line in each pair of lines being in the true form and the other being in the complement form, corresponding blocks in each of said positions being controlled by a different one of said N pairs of lines, all of the first blocks in each pair of blocks being connected to the same form of control line, and all of the second blocks in each pair being connected to the other form of control line; and circuit means for transferring data bits from a first one of said positions to $N-1$ of the remaining positions in said row, the location of each of said $N-1$ positions with respect to said first position being given by a different one of the terms of the progression $2^0, 2^1, 2^2, \ldots 2^{N-2}$; said circuit means including connecting lines between the input of a selected block in each one of said $N-1$ positions and the outputs of a different pair of blocks in said first position, each one of said selected blocks being the first block of that pair of blocks receiving the next excitation signal in said sequence after the excitation signal supplied to the pair of blocks in said first position connected thereto.

3. A shift register comprising:

a plurality of bit storage positions arranged in a row for storing data bits, each said position including a plurality of logic blocks connected in a series loop;

excitation supply means for supplying cyclic excitation signals in a sequence to said blocks to circulated data bits within each series loop in a synchronized fashion with corresponding blocks in each loop receiving an excitation signal at the same time;

coupling means for connecting the outputs of the blocks in a first one of said series loops to the blocks in a plurality of other series loops, the connections between each block being selected to couple blocks in said first series loop which receive the excitation signal in said sequence immediately preceding the excitation signals received by the blocks in the other loops connected thereto; and means for controlling said coupling means to transfer the data bits in said first loop selectively to any of said other loops.

4. A shift register comprising:

a plurality of bit storage positions arranged in a row for storing data bits, each of said bit positions including N logic blocks where N is any integer, said blocks being interconnected to form a series loop;

an excitation supply means having $N/n$ phrases where $n$ is any integer, for supplying cyclic excitation signals in a sequence to the blocks in each position to circulate data bits within each loop in a synchronized fashion with corresponding blocks at each loop receiving an excitation signal at the same time;

circuit means for coupling the outputs of the blocks in a first one of said loops to the blocks in a plurality of the other loops, the connections between each block being selected to couple blocks in said first loop which receive the excitation signal in said sequence immediately preceding the excitation signals received by the blocks in the other loops connected thereto; and means for controlling said coupling means to transfer the data bits in said first loop selectively to any of said other loops.

References Cited by the Examiner

UNITED STATES PATENTS

| | | | |
|---|---|---|---|
| 2,767,908 | 10/1956 | Thomas | 328—37 |
| 3,011,706 | 12/1961 | Goto | 235—92 |
| 3,079,513 | 2/1963 | Tokelson | 307—88.5 |
| 3,158,753 | 11/1964 | Creveling | 307—88.5 |
| 3,174,106 | 3/1965 | Urban | 328—37 |

ARTHUR GAUSS, *Primary Examiner.*